May 11, 1926.
G. M. LUDLOW
1,584,109
CHART HOUSING AND BEARING FOR SCALES
Filed Oct. 1, 1924
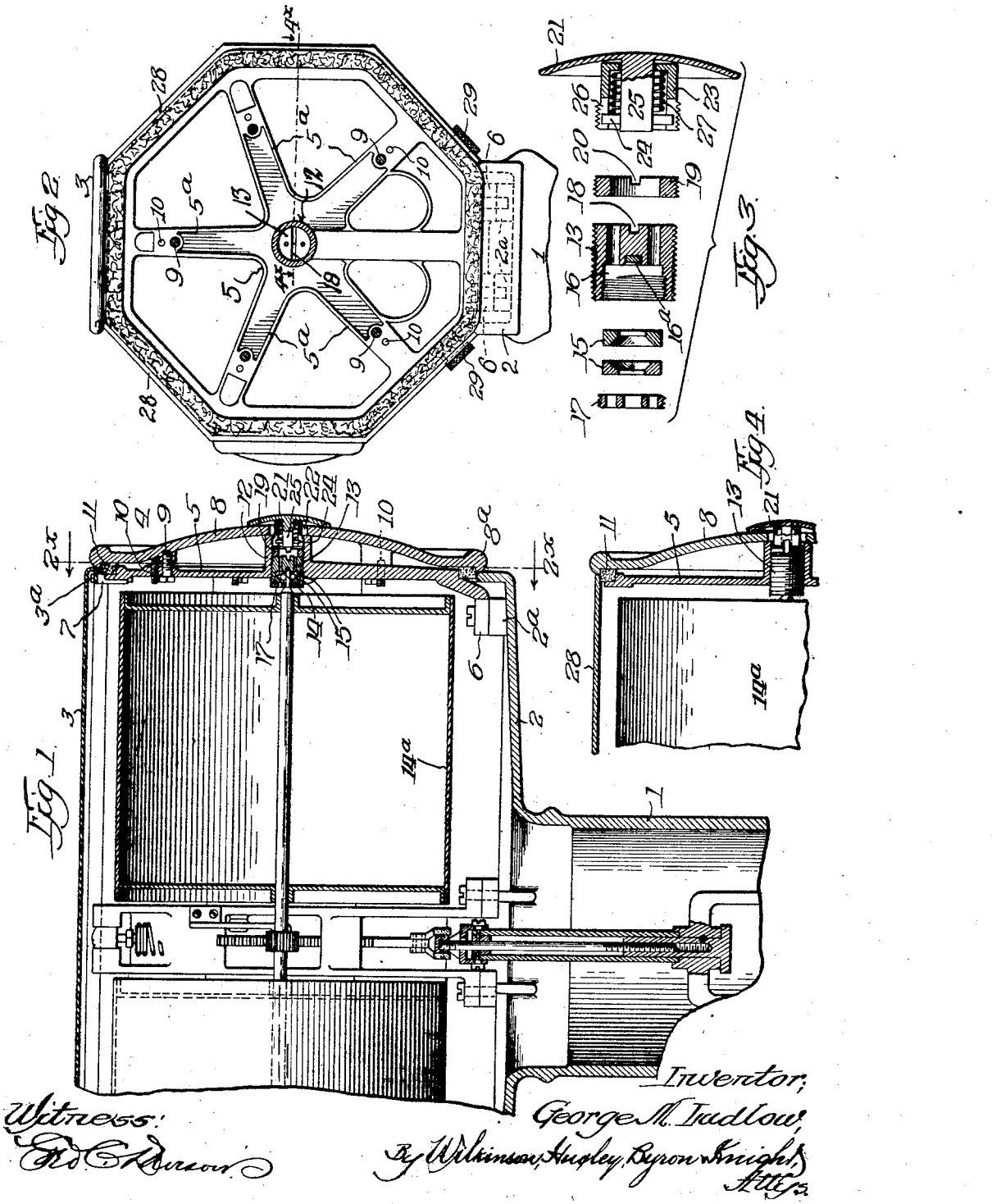

Patented May 11, 1926.

1,584,109

UNITED STATES PATENT OFFICE.

GEORGE M. LUDLOW, OF EVANSTON, ILLINOIS, ASSIGNOR TO SANITARY SCALE COMPANY, OF CHICAGO, ILLINOIS, A CORPORATION OF ILLINOIS.

CHART HOUSING AND BEARING FOR SCALES.

Application filed October 1, 1924. Serial No. 740,899.

This invention relates to a housing for the rotary chart of a scale, and to bearings mounted in said housing in position to receive the journals upon which the chart rotates. The embodiment of the invention selected for illustration is designed with special reference to rotary scale chart housings embodying the operative and structural principles disclosed in U. S. Letters Patent No. 1,495,754 issued May 27, 1924, to the present inventor, but the invention may be applied to other chart housings as well.

One object of the present invention is to improve the end construction of a chart housing in a manner to permit it to be mounted more accurately upon the column, head or other member which supports it so that the chart journal bearing which it carries can be presented in perfect alignment with the shaft of the chart, and any other member that may be supported thereon, for instance, the top bar of the chart housing of the aforesaid patent, can be supported in more exact position, and yet the portion of the end construction which constitutes the outer wall, or end-closure can be subjected to enameling or other finishing processes involving subjection to high temperatures which sometimes distorts the member, without impairing the position of the bearing or other supported parts; and to this end one feature of the invention consists in making the end construction of the housing in two members, namely a frame member which can be accurately machined to establish a precision fitting between it and the member which supports it, and a separately formed end wall, which after being enameled or otherwise finished, can be mounted upon the frame member and given any desired set relatively thereto.

Another object of the invention is to provide an improved construction of bearing through means of which the journal of a chart shaft can be mounted in the frame member of a chart housing end construction of the kind described, and rendered accessible from the outside for imparting necessary adjustments; and to this end another feature of the invention consists in providing the frame member of the end construction with a central hub adapted to be machined about an axis definitely related to the faces of the precision fitting through which the frame member is supported, and providing in said hub, a ball-bearing comprising a cylindrical block through which the bearing is axially adjustable as a whole in said hub and having its race-way composed of two complementary concaves mounted in a shouldered cavity of said block, and confined by a threaded follower, so that the race-way of the bearing can be made with great accuracy and the train of balls can be presented in a plane exactly transverse to the axis of the journal.

Still another object is to provide a cap piece for closing the opening in the end wall affording access to the bearing and to adapt said cap piece to serve as an escutcheon; to which end, a further feature of the invention consists in providing a cap adapted to overlie the outer surface of the end wall, and a screw plug carrying said cap, which extends through the opening of the outer wall and into threaded engagement with the bore of the hub; the screw plug being non-rotatable but axially resilient relative to the cap so that the cap piece as a whole can be turned to any given angle of adjustment even after the cap enters into impingement against the outer surface of the end wall, to bring its initials or other indicia in proper reading position.

Still another object of the invention is to provide a packing of fibrous or other deformable material between the end and side walls of a chart housing of the kind herein described; and, to this end, another feature of the invention consists in locating upon the periphery of the end frame a packing strip in position to receive the end margins of the side walls, and preferably also the end of the T-head or support upon which the end frame is mounted; a subordinate idea incident to the preferred embodiment of this feature consisting in confining this packing between the end frame and the end wall, and utilizing it to form a dust-tight connection between said wall and frame.

In the accompanying drawing in which the preferred embodiment of the invention is shown by way of illustration, Figure 1 is a fragmentary view in vertical axial section, of a portion of a chart housing and the column and T-head by which it is supported.

Figure 2 is a section on the line 2ˣ—2ˣ of Figure 1.

Figure 3 is a segregated view in axial section of the several parts which constitute the journal bearing and the closing cap therefor; and Figure 4 is a detail view in section on the line 4ˣ—4ˣ of Figure 2.

1 represents an upstanding column, 2 the T-head, and 3 the top bar of a chart housing which, as herein designed, correspond substantially to similar parts in U. S. Patent No. 1,495,754 before referred to. 4 represents the new end structure of such chart housing. This comprises a spider-like frame 5 having an attaching foot 6 through which it rests upon and is secured to the supporting block 2ᵃ of the T-head 2 said foot and block, while portions of cast iron members being subject to grinding to establish what I have herein called a precision fit between the parts, and insure a true upright positioning of the end frame, also bosses 7 receiving screws 3ᵃ of the top bar; also the end wall 8 which constitutes the outer closure of the end structure and is formed separately from and mounted upon the frame member 5 by any suitable means, such, for instance, as tension screws 9 and spacing screws 10 fitted in the respective spider arms 5ᵃ which are adjustable to rigidly fix the end wall relatively to the frame member even though the end wall should become distorted under the high temperatures to which it may be subjected in giving it an enamel or other finish. An annular packing 11 of felt or other suitable material is confined between the circumferential marginal portions of the end wall 8 and frame member 5 in order to effect a dust-tight closure between these parts and to present such packing in position to receive the ends of the longitudinal side walls 28 of the housing.

Frame member 5 has a hub 12 in which is mounted the bearing 13 for the journal 14 of the chart 14ᵃ and the bore of this hub is dressed and threaded with such reference to the precision fitting or accurately machined face through which the foot 6 rests upon the block 2ᵃ, that the journal bearing will be presented accurately in alignment with the axis on which the chart rotates.

The journal bearing comprises a cylindrical block 13 threaded into the bore of the hub 12 so as to be adjustable axially therein, and a pair of concaves 15 which together constitute a race-way for the balls of the bearing, fitted in the cavity 16 of said block and there secured by the threaded follower 17. The concaves 15 are made of special metal of great hardness, by casting them in approximate form and then finishing by grinding, as this method of production insures accuracy of form and renders pitting of the race-way surfaces practically impossible. By mounting the ball raceway in block 13 as described, all parts of the bearing become axially adjustable as a whole by the mere expedient of rotating the block through the medium of a suitable tool inserted in its diametrical slot 18. 19 represents a jam nut adjustable through the medium of a tool introduced into its slot 20, and adapted to impinge against the cylindrical block 13 to hold the latter in any position to which it may be adjusted. The inner end wall of the cavity 16 in bearing block 13 carries a thrust plate 16ᵃ of hardened metal and this thrust plate is concentric with and axially beyond the raceway 15 and in position to receive end thrust of the chart journal 14. 21 represents a closing cap for the opening 22 in the end wall 8, and this cap is held in position by means of a plug 23 threaded to mesh with the internally threaded bore of the hub 12. In order that cap 21 may serve the æsthetic purpose of bearing a name, initial, escutcheon or other indicium, and always be arrested at an angle of revolution which presents its indicium in proper reading position, it maintains driving connection by which it may rotate its plug 23, through means of a pin 24 passing diametrically through the shank 25 of the cap 21 and entering a slot 26 in the plug 23. The dimension of the slot 26 in the direction of the axis of the plug is sufficient to afford relative axial movement between the cap and the plug and this being yieldingly resisted by a spring 27, surrounding the shank 25, it will always be possible to continue rotation of the plug 23 after the cap 21 comes into impingement against the outer surface of end wall 8 for at least a limited distance necessary to bring into reading position any mark that may be upon the cap, and the spring 27 will thereafter hold the cap in contact with the end wall. The novel end structure for chart housings herein described serves with a special advantage in adapting the end closure to the side walls of a chart housing when the latter exist in substantially the relationship disclosed in the previous Letters Patent herein identified. Thus side walls 28 (Figure 2) releasably engaged at their upper edges 28ᵃ with the top bar 3 and supported vertically by having their lower edges in abutment against the T-head 6 (Fig. 2) to which they are secured by set screws 29, as described in the aforesaid patent, will according to the present invention conform substantially to the perimeter of the spider-like frame 5 and their end margins will overlie the peripheries of the end frames, as shown in Figure 4 and be received upon the packing 11 which is confined between said frame and the end wall 8, and inasmuch as they conform likewise to the roll or bead 8ª of the end wall, the latter, in serving as an end-closure for the housing, is adapted to the end edges of said side walls, and thus the whole end of the chart housing is made dust-tight.

I claim:

1. In a chart housing for weighing scales, a supporting member, end frames mounted on said supporting member, separately formed end walls mounted upon said end frames independently of said support, and means for varying the spacing of the end walls from the end frames at a plurality of points at will.

2. A chart housing for weighing scales, comprising a supporting member, end frames mounted on said supporting member, side walls overlying the peripheries of said end frames, separately formed end walls facing the ends of said side walls, and means for securing said end walls to said end frames and varying the spacing between them at a plurality of points.

3. A chart housing for weighing scales, comprising a supporting member, end frames mounted on said supporting member, a top bar, side wall members releasably engaging the top bar and having their ends overlying the peripheries of the end frames, and separately formed end walls mounted upon said end frames independently of said support, facing the ends of said side wall members but leaving the same free for removal without displacement of the end walls; said end walls being adjustably spaced relatively to the end frames at a plurality of points.

4. A scale chart housing, comprising a supporting member, an end construction mounted on said supporting member, and a chart bearing mounted in said end construction; said end construction comprising a frame member through which it is mounted upon said support, a separately formed end wall adapted to said frame member, and means for securing said end wall upon and positioning it relatively to said frame member, including means for drawing the end wall to the frame member and opposing means for spacing it therefrom.

5. A scale chart housing comprising a supporting member, and an end construction mounted on said supporting member and comprising a frame member through which the end construction is fitted to the support, a separately formed heat-treated end wall adapted to said frame and means for fixing the end wall relatively to the frame at a plurality of distributed points conformable to irregularities in the shape of the end wall.

6. A scale chart-housing comprising a supporting member, an end frame having a precision fitting through means of which it is mounted on said support, and a heat-finished end wall adapted to said frame and having adjustable means for fixing it relatively to the frame at a plurality of points distributed over the area of the end wall.

7. A scale chart housing comprising a supporting member, an end frame having a precision fitting through means of which it is mounted on said supporting member, a separately formed end wall adapted to said end frame, a packing located between opposed marginal portions of said frame and wall, and means for fixing said wall upon said frame.

8. A scale chart housing comprising a supporting member, an end frame having a precision fitting through means of which it is mounted on said supporting member, a separately formed end wall adapted to said end frame, a packing located between opposed marginal portions of said frame and wall, and a plurality of independently adjustable means for fixing said wall to said frame at a plurality of segregated points.

9. In a scale chart housing, a support, an end frame having a precision fitting to which it is mounted upon said support, a top bar supported on said end frame, side walls terminating adjacent to the perimeter of said frame, and a separately formed end wall mounted upon said end frame and adapted to the ends of said side walls.

10. In a scale chart housing, a support, an end frame having a precision fitting by which it is mounted upon said support, a top bar supported on said end frame, side walls terminating adjacent to the perimeter of said frame, and a separately formed end wall mounted upon said end frame and adapted to the ends of said side walls; said end frame carrying a marginal packing in position to receive end margins of said side walls.

11. A scale chart housing comprising a supporting member, an end frame mounted on said supporting member, a top bar mounted on said end frame, side walls conforming to and terminating at the perimeter of said end frame, a separately formed end wall mounted upon said end frame and conforming to the ends of said side walls, and a packing confined between the marginal portions of said frame and wall, and presented in position to receive end marginal portions of the side walls.

12. In a scale chart housing, a support, an end frame mounted on said support and constructed with a central hub, a chart bearing mounted in said hub and a separately formed end wall mounted upon said end frame.

13. In a scale chart housing, a supporting member, an end frame mounted on said supporting member and constructed with a hub, a journal bearing mounted in said hub, a separately formed end wall adapted to and mounted upon said frame and a cap carried by said end wall in position to close the outer end of said hub.

14. In a scale chart housing, a supporting member, an end frame mounted on said supporting member and constructed with a hub, a journal bearing mounted in said hub, a separately formed end wall adapted to and mounted upon said frame and a cap carried by said end wall in position to close the outer end of said hub; said cap being removable to afford access to the bearing in the hub.

15. In a scale chart housing, a supporting member, an end frame mounted on said supporting member constructed with a hollow hub, a chart bearing mounted in said hub with adjustability relatively to the hub in the direction of its axis, a separately formed end wall mounted upon said frame, and a hub closing cap overlying said wall.

16. In a scale chart housing, a supporting member, an end frame mounted on said supporting member constructed with a hollow hub, a chart bearing mounted in said hub with adjustability relatively to the hub in the direction of its axis, a separately formed end wall mounted upon said frame, and a hub closing cap overlying said wall and extending through the same and into engagement with the hub.

17. In a scale chart housing, a supporting member, an end frame mounted on said supporting member constructed with a hollow hub, a chart bearing mounted in said hub with adjustability relatively to the hub in the direction of its axis, a separately formed end wall mounted upon said frame, and a hub closing cap overlying said wall; said end cap being provided with a plug which extends through the end wall and into engagement with said hub.

18. A scale chart housing, a supporting member, an end frame mounted on said supporting member constructed with a hub, a chart bearing mounted on said hub, a separately formed end wall adapted to said end frame, an end cap, and a securing plug carrying said end cap, extending through said end wall and having threaded engagement with said hub.

19. A scale chart housing, a supporting member, an end frame mounted on said supporting member constructed with a hub, a chart bearing mounted on said hub, a separately formed end wall adapted to said end frame, an end cap, and a securing plug carrying said end cap, extending through said end wall and having threaded engagement with said hub; said end cap being fixed against rotation relatively to its securing plug but axially movable relative thereto.

20. A scale chart housing, a supporting member, an end frame mounted on said supporting member constructed with a hub, a chart bearing mounted on said hub, a separately formed end wall adapted to said end frame, an end cap, and a securing plug carrying said end cap, extending through said end wall and having threaded engagement with said hub; said end cap being fixed against rotation relatively to its securing plug but axially movable relative thereto, and having a spring positioned to resist such relative axial movement.

21. In a weighing scale, a chart housing having an end construction comprising an end frame and a separately formed end wall mounted on said end frame, and a chart-supporting bearing block mounted in said end frame with axial adjustment; said end wall being constructed with an opening affording access to said block, and through which the block can be adjusted.

22. In a weighing scale, the combination of a rotary chart, a housing for said chart having an end construction comprising an end frame and a separately formed end wall mounted on said end frame, a ball bearing for the shaft of said chart, and a block in which said ball bearing is housed and which is mounted in said end frame with adjustment in the direction of the axis of the chart; said end wall being constructed with an opening in alignment with said block and through which said block may be adjusted.

23. In a weighing scale, a chart housing comprising side walls, and an end construction comprising an end frame, a separately formed end wall mounted on said frame, and a packing confined between said end wall and frame and held thereby in position to receive the end marginal portions of the side walls.

24. In a weighing scale, a supporting head, end frames mounted upon said head near its ends, side walls supported by said head independently of the end frames, and packings carried by said end frames in positions to close the space between the end frames and the side walls and also between the end frames and the head.

Signed at Chicago, Illinois, this 27th day of September, 1924.

GEORGE M. LUDLOW.